Patented July 28, 1953

2,647,058

UNITED STATES PATENT OFFICE 2,647,058

BEVERAGE

Abraham Schapiro, Kentfield, Calif.

No Drawing. Application June 7, 1951,
Serial No. 230,420

14 Claims. (Cl. 99—105)

This invention relates to non-alcoholic beverages containing nutritive and physiologically active substances and to processes for producing the same. In particular the invention relates to non-alcoholic beverages including sugars, flavonoid substances and other hot water soluble extractives derived from grapes. In its preferred form the invention relates to non-alcoholic beverages including biologically effective amounts of vitamin C and flavonoid substances derived from grapes which have a potentiating effect on the vitamin C, namely, the effect of prolonging the retention of vitamin C in the body and enhancing its biological efficacy.

In accordance with the present invention I produce first a stable liquid concentrate from ripe grapes containing the hot water soluble sugars, minerals, acids and flavonoid substances present in the grapes. This product may then be treated in any one or more of a number of ways to form a palatable and highly nutritious non-alcoholic beverage. Thus it may be diluted with water to the desired solids content or it may be mixed with orange juice and other citric juices and with tomato juice or other juices containing vitamin C, or with other fresh fruit juices; or it may be enriched with biologically effective amounts of vitamin C and then diluted with water or other liquids including fresh fruit juices containing no vitamin C or only inconsequential amounts of vitamin C.

The grapes from which the flavonoid-containing substances of the present invention are derived are of the Vitis vinifera type. These grapes produce a juice which is low in acid and high in sugar content and for that reason they are unsuitable for ordinary beverage purposes. In accordance with the present invention the grape extract produced as hereinafter described is treated to effect an increase in the ratio of acid to sugar over that normally present in the juice from a grape of the Vitis vinifera type, with the result that the flavor of the product is improved and the palatability made comparable to juices derived from the Vitis labrusca type of grape of which the Concord grape is representative.

The Vitis vinifera type of grape includes the California table, wine and raisin varieties. Examples of these grapes are Thompson seedless, Tokay, Emperor, Malaga, Alicante, Carrignane, Zinfandel, Mission, Malvoisie and Sultana. In the preparation of the non-alcoholic beverages in accordance with the present invention either the whole or the dried grape (raisin) or any mixture of grapes or raisins or of grapes and raisins may be used as the starting material.

In the practice of the process to produce a stable liquid concentrate from whole ripe grapes and/or raisins, the starting materials are subjected to a succession of hot water leaching operations which insures that there will be present in the final concentrate substantially all of the soluble sugars, minerals, other nutrient values and the flavones and other flavonoid substances present in the grape including the skin. My process is so carried out as to recover substantially all of the soluble flavonoid substances present in the starting materials because these flavonoid substances have a nutritional and/or therapeutic factor generally associated with vitamin P. These flavonoid substances are particularly desirable in a beverage containing vitamin C because they have a vitamin C potentiating effect. By this I mean a capacity of activating or enhancing vitamin C activity and prolonging the retention of vitamin C in the body, thus increasing its biological effectiveness. This vitaman C potentiating effect may be measured biologically by the odontoblast assay method.

In the following description of the process for producing my stable liquid concentrate, it will be understood that the starting material may be a single species of grape of the Vitis vinifera type or a mixture of such species, it being further understood that the species may be in the form of the whole ripe grape or in raisin form and mixtures thereof. It is preferred to use the whole ripe grape as the starting material.

In carrying out the process whole ripe grapes, for example, in cluster form, are introduced into a crusher. This is of conventional construction and comprises a large enclosed perforated cylinder with revolving paddles arranged helically on a central shaft. The grapes are crushed by the revolving paddles and the expelled juice and pomace (skins and seeds) drop through the perforations and are pumped to an open receiving tank. The stems are rejected from the machine and are discarded insofar as the present process is concerned. The grape juice and pomace is maintained in the receiving tank at a temperature of 120°–140° F., preferably 130°–140° F., for a period of from 4 to 8 hours. During this period of time the free-run juice, namely, the juice derived from the crushing operation, settles to the bottom of the tank and the pomace rises to the top. The free-run juice, in an amount equivalent to approximately three-quarters the amount of juice originally present in the grapes, is drawn off from the tank and sent to a storage tank. The gravity of this free-run juice varies from 16°–30° Brix (20° Balling), usually from 18°–20° Brix.

The residue remaining in the tank consists of grape pomace and adhering juice. Water is now added to the tank in an amount corresponding to the volume of the residue and is admixed therewith. The mixture is maintained at a temperature in the range of 125°–140° F., preferably 135°–140° F., for a period of 4 to 8 hours. Within this period of time the pomace rises to the top and the mixture of free-run juice and water is then drawn off from the bottom in an amount corresponding to the amount of added water. The gravity of the draw-off may vary from about 8°–15° Brix. This draw-off is sent to the storage tank and admixed with the free-run juice.

The hot water leaching operation previously described is repeated for a total of five times, at which time approximately 98–99% of the total extractable substances present in the whole grape are recovered. The draw-off from the fifth hot water leaching operation has a gravity of about 1°–1.5° Brix. All of the draw-offs from the successive leaching operations are sent to the storage tank and mixed therein until the original free-run juice and the extracts are blended into uniform admixture. The temperature of the contents of the storage tank is maintained at about 120°–130° F.

The blend in the storage tank is then sent to a concentrating apparatus where it may be concentrated to any desired point. It is preferred that the blend be concentrated under vacuum, preferably until it has a gravity of from about 68°–71° Brix, preferably 70° Brix. The resulting 68°–71° Brix product is stable and can be stored at room temperatures as high as 90°–100° F. and even higher for long periods of time, say about a year and even more, without fermenting. The 68°–70° Brix concentrate when diluted with about five volumes of water is suitable for use as a nutritive and therapeutic beverage, either with or without the addition of vitamin C (ascorbic acid). It is preferred that the concentrate be fortified with biologically effective amounts of vitamin C, say amounts varying from 1 to 5 grams per gallon of the 68°–71° Brix concentrate. The amount of vitamin C added to a concentrate in accordance with the present invention is sufficient to provide in the final product, the beverage, an amount of vitamin C at least corresponding to recommended minimum daily requirements, namely, about 200 to 1000 mg. of vitamin C per gallon of beverage.

The process of producing the stable liquid concentrate of the present invention may be carried out continuously or batch-wise, as desired. As is known, grapes are seasonal fruits and the crushing operation usually takes place after the ripe grapes are removed from the vine. Accordingly, at the beginning of the operation hereinabove described, the first water extraction is carried out with clear water. Once the operation has been carried through the fifth leaching, fresh water is then used in the subsequent fifth leachings in treating the residue from the fourth leaching operation and the draw-off from the fifth leach is used in the fourth leach; that from the fourth in the third; etc. Thus a fairly concentrated leach water is used as the leach for the pomace originally separated from the free-run juice.

As noted above, juices from the *Vitis vinifera* type of grape are unsuitable for ordinary beverage juice purposes because they are low in acid and high in sugar content. The diluted concentrate of the present invention is more suitable as a beverage from the standpoint of flavor and taste than is the free-run juice obtained from the grape. I have found, in accordance with the present invention, that I can develop in the concentrate a higher acidity and a correspondingly higher ratio of acid to sugar and thereby impart to the concentrate an improved flavor and taste. I accomplish this as follows.

Portions of the various leachings are separated from the leach waters before they are sent to the storage tank for blending with the free-run juice and are blended in a separate tank. The temperature of these blended leachings is reduced to 100°–122° F. and they are then inoculated with lactic acid bacteria strains capable of converting sugars to lactic acid at this temperature. The preferred lactic acid organisms for this purpose are *Lactobacillus delbruckii* and *Bacillus dextrolacticus*, but other similar organisms such as *Lactobacillus pentoceticus* and various Torulatype yeast and acid producing molds may be used. The treatment of the leachings with these organisms at the temperature stated permits the development of the desirable acidity and some desirable flavor characteristics without the development of wild yeast and the fermentation of sugars into alcohol which would eventually be lost in the vacuum concentrating apparatus. The acidity is permitted to develop to varying degrees, say from 1% to 3% total acid (calculated as tartaric acid), and these acid-fermented leachings are then blended with the blend of the sweet free-run juice and other sweet leachings to give a product having a total acid content (calculated as tartaric acid) of 0.6–0.8%. This corresponds to a pH of the finished product of from about 3.8–4.1. This blend is then concentrated to a 70° Brix product, as described above.

The following experiment was carried out to show that the beverage of the present invention has present therein flavonoid substances which enhance the biological efficacy of ascorbic acid (vitamin C) and that beverages containing ascorbic acid and this concentrate have a higher biological potency than is indicated by chemical methods of assay. The test used to show this was the odontoblast assay method reported by E. W. Crampton, The Growth of Odontoblasts of the Incisor Tooth as a Criterion of the Vitamin C Intake of the Guinea Pig. J. Nutrition 33, 491 (1947).

The guinea pigs used in the experiment were maintained on the Macdonald Guinea Pig Basal Diet No. 5 devised by Crampton. The diet was prepared from the following ingredients:

|  | Percent by weight |
|---|---|
| Ground dried beet pulp | 25 |
| Ground oats | 15 |
| Ground wheat | 10 |
| Linseed oil meal | 12.5 |
| Fish meal | 5 |
| Dried brewer's yeast | 10 |
| Bone charcoal | 4 |
| Skim milk powder | 15 |
| Molasses | 3 |
| Iodized salt | 0.5 |

The feed mixture was pelletted and was fed ad libitum throughout the experiment. Free access to water was allowed all animals excepting those receiving the beverage of the present invention. Each animal received vitamin supplements as follows:

Ascorbic acid, 1 mg. per day
a-Tocopherol (as acetate), 3 mg. per day
Vitamin A, 495 I. U. per day
Vitamin D, 40 I. U. per day Ascorbic acid was given as a 2% aqueous solution every other day. The a-tocopherol acetate was mixed with a fish-liver oil concentrate (Sardilene), and given every fourth day in amounts to provide the equivalent of the daily doses as given above.

The guinea pigs used were about twenty-eight days of age (plus or minus 2-3 days) at the start of the experiment. They were allotted to experimental groups as follows: controls, those treated with the beverage, and those treated with sodium hesperidin chalcone (a flavonoid material derived from lemon peel). The animals taking the beverage were allowed free access to their individual jars of juice and the volume drunk was measured and recorded. Water was withheld from the animals given the beverage in order to promote drinking thereof. The guinea pigs receiving sodium hesperidin chalcone as the reference compound were given by mouth 100 mg. a day in water.

At the end of a 36-day period, the animals were killed by chloroform. The lower jaw of each was removed and divided between the incisor teeth. The biting end of the incisor, and the jaw bone behind the molars, was clipped off and the remaining specimen placed in 10% formalin. The teeth were prepared, sectioned, and stained in accordance with the detailed procedure given by Crampton. Measurements were then made of the height of the mature odontoblast cells in the prescribed area of reading, using a microscope fitted with a micrometer eye piece.

The results of measurements of the odontoblasts in the animals are shown in the following table.

|  | Controls | Sodium hesperidin chalcone | Grape beverage |
|---|---|---|---|
| No. of animals | 3 | 2 | 3 |
| No. of odontoblast readings | 13 | 9 | 14 |
| Mean height of odontoblasts | 27.1μ | 36.1μ | 35.4μ |
| Range of readings | 22–35μ | 30.8–48.4μ | 26.4–44μ |

The vitamin C potentiating effect of the beverage of the present invention was obtained on average daily intakes of 34.4, 34.9 and 24.5 ml. of the beverage by the three animals in the test group. The total ascorbic acid content of the beverage fed to the animals was determined chemically and was found to be so low as to be incapable of having anything comparable to the effect obtained in the foregoing experiment.

The concentrate and/or the water-diluted concentrate may be blended with citrus juices or vegetable juices containing biologically effective amounts of vitamin C or with other fresh fruit and vegetable juices such as boysenberry juice, peach juice, apricot juice, apple juice, tomato juice, carrot juice, and any desired mixture thereof. In arriving at the formulation of fresh fruit and/or vegetable juice combinations with the stable liquid concentrate of the present invention, a guiding factor is the ratio of total acidity (calculated as citric acid) to percent total solids (calculated as dextrose), necessary to provide a palatable product. On this basis, the palatability ratio is 1% acidity to approximately 16.5% total solids. The following are illustrative examples of blends of fruit juice combinations with the liquid concentrate in accordance with the present invention.

|  | °Brix | Gals. |
|---|---|---|
| Grapefruit juice | 11 | 93.5 |
| Flavonoid-containing concentrate | 70 | 6.5 |
| Orange juice | 12 | 96 |
| Flavonoid-containing concentrate | 70 | 4 |

The proportions of the constituents of the foregoing compositions may be varied. Thus, for example, the citrous juice content may vary from 90%–96% of the compositions, the balance being the 70° Brix concentrate. If the water-diluted concentrate is used the citrous juice content may vary from 50%–96%, depending upon the extent of the 70° Brix concentrate.

I claim:

1. A stable liquid concentrate derived from edible products of the class consisting of grapes and raisins of the *Vitis vinifera* type, suitable for using in making a beverage, said concentrate being a concentrate of a mixture of free run juice obtained from said starting material and of the hot water extract derived from the pomace of the starting material, and containing the soluble sugars and minerals and other nutrient values present in the starting material and flavonoid substances derived from the starting material in amounts capable of enhancing the biological efficacy of vitamin C, the said concentrate containing about 98–99% of the total extractable substances present in the starting material.

2. A stable liquid concentrate derived from edible products of the class consisting of grapes and raisins of the *Vitis vinifera* type, suitable for using in making a beverage, said concentrate being a concentrate of a mixture of free-run juice obtained from said starting material and of the hot water extract derived from the pomace of the starting material, and containing the soluble sugars and minerals and other nutrient values present in the starting material and flavonoid substances derived from the starting material in amounts capable of enhancing the biological efficacy of vitamin C, said concentrate having a total acid content varying from 1 to 3% (calculated as tartaric acid), the said concentrate containing about 98–99% of the total extractable substances present in the starting material.

3. A stable liquid concentrate derived from edible products of the class consisting of grapes and raisins of the *Vitis vinifera* type, suitable for using in making a beverage, said concentrate being a concentrate of a mixture of free run juice obtained from said starting material and of the hot water extract derived from the pomace of the starting material, and containing the soluble sugars and minerals and other nutrient values present in the starting material, flavonoid substances derived from the starting material in amounts capable of enhancing the biological efficacy of vitamin C, and biologically effective amounts of vitamin C, the said concentrate containing about 98–99% of the total extractable substances present in the starting material.

4. A beverage comprising water, sugars, minerals and other hot water extracted nutrient values derived from edible products of the class consisting of grapes and raisins of the *Vitis vinifera* type, and flavonoid substances in amounts capable of enhancing the biological efficacy of vitamin C, said beverage having a total acid content of from 0.6 to 0.8% (calculated as tartaric acid).

5. A beverage comprising water, sugars, minerals and other hot water extracted nutrient values derived from edible products of the class consisting of grapes and raisins of the *Vitis vinifera* type, biologically effective amounts of vitamin C and flavonoid substances in amounts capable of enhancing the biological efficacy of vitamin C.

6. A beverage comprising a juice of the class consisting of fruit and vegetable juices, and sugars, minerals and other hot water extracted nutrient values derived from edible products of the class consisting of grapes and raisins of the *Vitis vinifera* type, and flavonoid substances in amounts capable of enhancing the biological efficacy of vitamin C.

7. A beverage comprising a citrus juice, and sugars, minerals and other hot water extracted nutrient values derived from edible products of the class consisting of grapes and raisins of the *Vitis vinifera* type, and flavonoid substances in amounts capable of enhancing the biological efficacy of vitamin C.

8. A beverage comprising orange juice, and sugars, minerals and other hot water extracted nutrient values derived from edible products of the class consisting of grapes and raisins of the *Vitis vinifera* type, and flavonoid substances in amounts capable of enhancing the biological efficacy of vitamin C.

9. A beverage comprising grapefruit juice, and sugars, minerals and other hot water extracted nutrient values derived from edible products of the class consisting of grapes and raisins of the *Vitis vinifera* type, and flavonoid substances in amounts capable of enhancing the biological efficacy of vitamin C.

10. A beverage comprising apple juice, and sugars, minerals and other hot water extracted nutrient values derived from edible products of the class consisting of grapes and raisins of the *Vitis vinifera* type, and flavonoid substances in amounts capable of enhancing the biological efficacy of vitamin C.

11. A beverage comprising peach juice, and sugars, minerals and other hot water extracted nutrient values derived from edible products of the class consisting of grapes and raisins of the *Vitis vinifera* type, and flavonoid substances in amounts capable of enhancing the biological efficacy of vitamin C.

12. A method of making a palatable and nutritive beverage from an edible product of the class consisting of grapes and raisins of the *Vitis vinifera* type, said method comprising crushing the said edible products to expel therefrom free-run juice, holding the resulting mixture of free-run juice and pomace in a tank until the pomace rises to the top of the mixture, drawing off from the mixture the free-run juice, subjecting the pomace to a succession of leaching operations with water, at a temperature of 125° to 140° F., inoculating at least one of the leaches while at a temperature of 100° to 122° F. with lactic acid bacteria organisms capable of converting sugars to lactic acid at this temperature, to increase the acidity of the leaching, and blending the acid-fermented leach and the other leachings with the free-run juice.

13. A method of making a palatable and nutritive beverage from an edible product of the class consisting of grapes and raisins of the *Vitis vinifera* type, said method comprising crushing the said edible products to expel therefrom free-run juice, holding the resulting mixture of free-run juice and pomace in a tank until the pomace rises to the top of the mixture, drawing off from the mixture the free-run juice, subjecting the pomace to a succession of leaching operations with water, at a temperature of 125° to 140° F., inoculating at least one of the leaches while at a temperature of 100° to 122° F. with lactic acid bacteria organisms capable of converting sugars to lactic acid at this temperature, to increase the acidity of the leaching, blending the acid-fermented leach and the other leachings with the free-run juice, and concentrating the blend under vacuum.

14. A method of making a palatable and nutritive beverage from an edible product of the class consisting of grapes and raisins of the *Vitis vinifera* type, said method comprising crushing the said edible products to expel therefrom free-run juice, holding the resulting mixture of free-run juice and pomace in a tank until the pomace rises to the top of the mixture, drawing off from the mixture the free-run juice, subjecting the pomace to a succession of leaching operations with water, at a temperature of 125° to 140° F., blending the free-run juice and the pomace extracts into uniform admixture, and concentrating the blend until it has a gravity of about 68°–71° Brix.

ABRAHAM SCHAPIRO.

References Cited in the file of this patent

UNITED STATES PATENTS

| Number | Name | Date |
|---|---|---|
| 1,596,233 | Bogle | Aug. 17, 1926 |
| 1,602,162 | Monti | Oct. 5, 1926 |
| 2,453,109 | MacDowell et al. | Nov. 9, 1948 |
| 2,567,038 | Stevens et al. | Sept. 4, 1951 |

FOREIGN PATENTS

| Number | Country | Date |
|---|---|---|
| 555 | Great Britain | Feb. 4, 1882 |